US007970418B2

(12) United States Patent
Schmidt et al.

(10) Patent No.: US 7,970,418 B2
(45) Date of Patent: Jun. 28, 2011

(54) METHOD AND SYSTEM OF PROVIDING EVENT CONTENT SHARING BY MOBILE COMMUNICATION DEVICES

(75) Inventors: Albert L. Schmidt, Hopkinton, MA (US); Stephen D. Morrison, Watertown, MA (US); Xi Zhang, Newton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 886 days.

(21) Appl. No.: 11/849,008

(22) Filed: Aug. 31, 2007

(65) Prior Publication Data

US 2009/0061835 A1    Mar. 5, 2009

(51) Int. Cl.
*H04Q 7/20*    (2006.01)
(52) U.S. Cl. ............... 455/456.5; 455/456.1; 455/456.6; 455/518; 701/214
(58) Field of Classification Search ............... 455/456.5, 455/456.1, 456.6, 518; 701/214
See application file for complete search history.

(56) References Cited

U.S. PATENT DOCUMENTS

| 7,136,636 | B1 * | 11/2006 | McLaughlin | ................. 455/423 |
| 2005/0188399 | A1 | 8/2005 | Tischer | |
| 2006/0217110 | A1 | 9/2006 | Othmer | |
| 2006/0241860 | A1 | 10/2006 | Kimchi | |
| 2006/0277308 | A1 | 12/2006 | Morse et al. | |
| 2007/0201376 | A1 | 8/2007 | Marshall-Willson | |
| 2007/0239562 | A1 | 10/2007 | Lawson | |
| 2007/0281689 | A1 * | 12/2007 | Altman et al. | ............. 455/435.1 |

FOREIGN PATENT DOCUMENTS

JP    2006101157    4/2006

OTHER PUBLICATIONS

International Search Report, PCT/US2008/074808 A1, Verizon Laboratories, Inc., Nov. 18, 2008, pp. 1-8.

* cited by examiner

*Primary Examiner* — Danh C Le

(57) ABSTRACT

An approach is disclosed for providing sharing of content relating to an event. Detection of a plurality of mobile communication devices within a predetermined location is performed. An event is identified corresponding to the predetermined location and a current time. The mobile communication devices are notified to enable exchange of content about the event. The content is received from one or more of the mobile communication devices, wherein the content is accessible by the mobile communication devices.

12 Claims, 7 Drawing Sheets

METHOD AND SYSTEM OF PROVIDING EVENT CONTENT SHARING BY MOBILE COMMUNICATION DEVICES

BACKGROUND INFORMATION

Wireless communication technologies afford users with the convenience of mobility and continually expanding set of capabilities. This convenience has spawned significant adoption by an ever growing number of subscribers as an accepted mode of communication for business and personal uses in terms of communicating using voice and data services. As wireless communication devices become more sophisticated, their features have expanded from merely placing and receiving calls to other enhanced services from music downloads to navigational systems. To support navigational services, cellular phones are equipped with Global Positioning System (GPS) technology to broadcast their locations. Given the competitive landscape of the telecommunication industry, service providers are continually challenged to develop new products and services. However, few applications have been developed to exploit such information about the users' locations.

Therefore, there is a need for an approach that provides enhanced communication services that exploit location information to improve user experience.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF THE PREFERRED EMBODIMENTS

An apparatus, method, and software for providing event content sharing are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to Multimedia Messaging Service (MMS) and Short Message Service (SMS) protocols, it is contemplated that these embodiments have applicability to other equivalent protocols.

Figure 1:
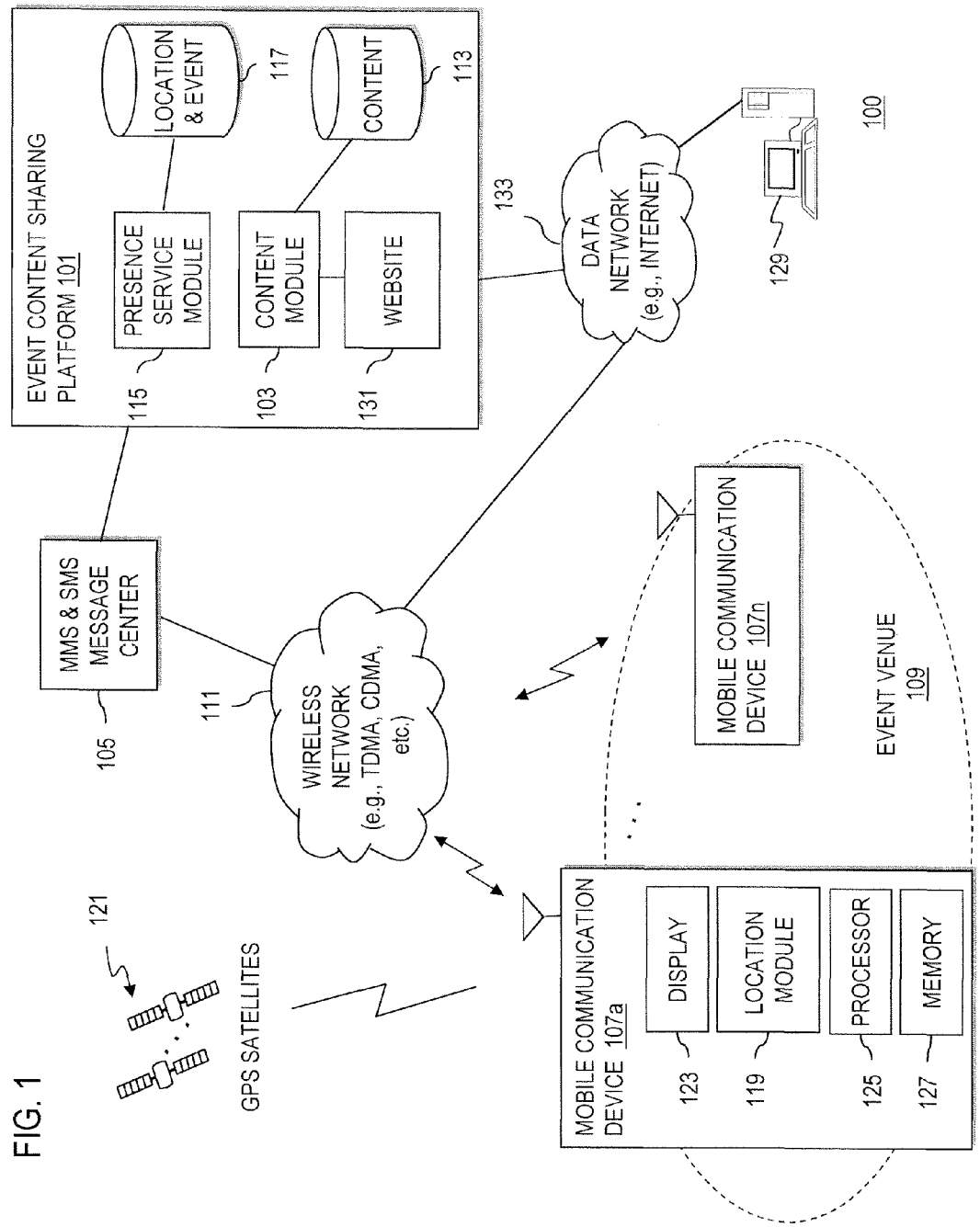
FIG. 1 is a diagram of a system capable of providing event content sharing by mobile communication devices, according with an exemplary embodiment.

FIG. 1 is a diagram of a system capable of providing event content sharing by mobile communication devices, according with an exemplary embodiment. A communication system 100 includes an event content sharing platform 101 for enabling users who are attending a common event to share information or content about the event. That is, the users can share or otherwise exchange information as an impromptu social network. As used herein, "content" refers to either text, image, audio, video, or any combination thereof. Under this scenario, the platform 101 includes a content module 103 that communicates with, according to one embodiment, a MMS (Multimedia Messaging Service) and SMS (Short Message Service) message center 105 to permit sharing of content among a group of mobile communication devices 107a-107n with users within an event venue 109. SMS service enables the transmission of short text messages among the devices 107a-107n in a store and forward manner. These short text messages in general can be delivered at any point in time using out-of-band packet, low-bandwidth delivery mechanisms. Similarly, MMS is a store and forward mechanism that supports transfer of media. Such content is uploaded from one or more of the mobile communication devices 107a-107n to the content module 103 via a wireless network 111, and is stored in a content database 113. The wireless network can employ various technologies, including Time Division Multiple Access (TMDA), Code Division Multiple Access (CDMA), etc. The venue 109 represents a location where users congregate to participate in an organized event; for example, stadium, park, area of a city for parades, towns for festivals. The event can include concerts, sporting events, festivals, parades, etc.

The event is identified based on the location of the users of the devices 107a-107n; a location and event database 117 is accessed to determine the particular event. As seen, an event and presence service module 115 consults with this database 117, which according to one embodiment, can be one or more third party events databases.

The platform 101 monitors and tracks the congregation of users using the event and presence service module 115. The module 115 provides status information regarding the position of the various devices 107a-107n about the venue 109. This event and presence service module 115 captures presence information or availability of the users of the devices 107a-107n. By way of example, upon a device exiting the venue 109, the presence module 115 removes the device from a list of active users, who are attending the event.

In an exemplary embodiment, each of the mobile communication devices 107a-107n includes a location module 119, which can obtain location (or positional) information using Global Positioning System (GPS) technology, and thus, behaves as a GPS receiver. The location module 119 communicates with a constellation of satellites 121, which transmit very low power interference and jamming resistant signals received by the GPS receivers 119. At any point on Earth, the GPS receiver 119 can receive signals from multiple satellites (e.g., 6 to 11). Specifically, the GPS receiver 119 may determine three-dimensional geolocation from signals obtained from at least four satellites. Measurements from satellite tracking and monitoring stations located around the world are incorporated into orbital models for each satellite to compute precise orbital or clock data. GPS signals are transmitted over two spread spectrum microwave carrier signals that are shared by GPS satellites 121. The device 107a needs to identify the signals from at least four satellites 121, decode the ephemeris and clock data, determine the pseudo range for each satellite 121, and compute the position of the receiving antenna.

With GPS technology, the wireless devices 107a-107n can determine their location with great accuracy and convenience. Also, the system 100 can employ Assisted GPS (A-GPS) to mitigate the loss of GPS signals from obstructions between the GPS receiver 119 and the satellites 121. When operating in A-GPS mode, the system 100 can provide for better in building or obstructed view geolocation. Assistance data can be transmitted to the devices 107a-107n from the wireless network 111, in an exemplary embodiment, can include ephemeris data differential GPS correct data, timing data and/or other aiding data. Using the aiding (or assistance) data, the location module 119 performs geolocation calculations. The geolocation data is then transmitted to the platform 101 on a periodic or on-demand basis. The transmission of geolocation data need not be frequent. Transmission of geolocation data is more compact because it is true location rather than pseudo range data. Also, the wireless devices 107a-107n can more intelligently request assistance data because the devices 107a-107n themselves can determine when the ephemeris data is no longer valid.

Each of the wireless devices 107a-107n utilizes a display 123 to present, for example, a graphic of a map of a predefined size (e.g., a street block wide, a mile wide, etc.). The wireless devices 107a-107n also includes a processor 125 and a memory 127 configured to store and execute instructions for supporting the event content sharing service, as well as other communication functions.

The event content sharing platform 101 also makes the content stored within the content database 113 available to a computing device 129. The computing device 129 can be a personal computer (PC), laptop, palm computer, workstation, web appliance, etc. The device 129 communicates with a website 131 over a data network 133 (which can include the global Internet). Under this arrangement, information to be shared among the devices 107a-107n can be viewed via a web browser or other web-based application.

According to one embodiment, the platform 101 uses positional information from the GPS enabled wireless devices to identify users who are located within the venue 109. This positional information is compared to a known location of the event; in an exemplary embodiment, a predetermined proximity to this predetermined location is established as to filter out users who are near the location, but are not in fact attendees. When an individual enters the venue a text message will be pushed to their mobile communication devices 107a-107n (e.g., cell phone) with the information needed to readily upload pictures, video and send text messages to the content module 115. All of the individuals within the venue 109 who have a compatible wireless device can upload text, pictures and video. The content module 115 can aggregate all the images (or pictures), video and text information. As noted, this information can be viewed by users inside or outside the venue 109 via a web browser.

In an exemplary embodiment, the platform 101 can provide advertisements that are relevant to the event. For example, if the event is a concert, then upcoming concerts and the performer's CDs (compact discs) can be advertised. Unlike traditional approaches, this approach permits more targeted advertising—namely, based on the user participating in a specific event.

The described platform 101, in one embodiment, enables large groups of users (e.g., strangers and friends/family, alike) to send information about a specific ongoing event. This forms an "ad hoc" network of users communicating about a common experience.

The operation, in one embodiment, of the event content sharing platform 101 is next explained.

Figure 2A:
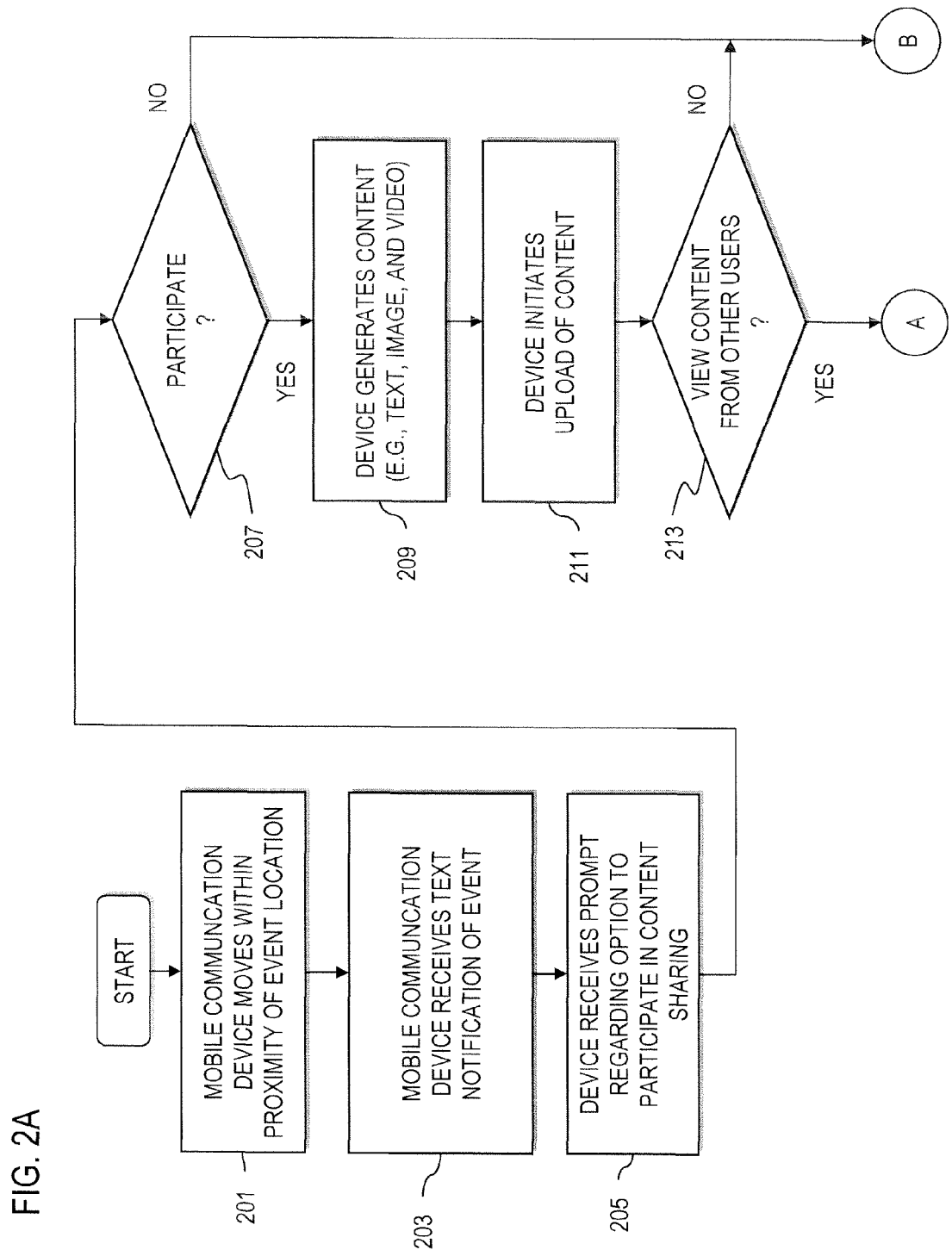
FIG. 2 is a flowchart of a process for sharing content, via mobile communication devices, regarding an event attended by users of the mobile communication devices, according to an exemplary embodiment.
Figure 2B:
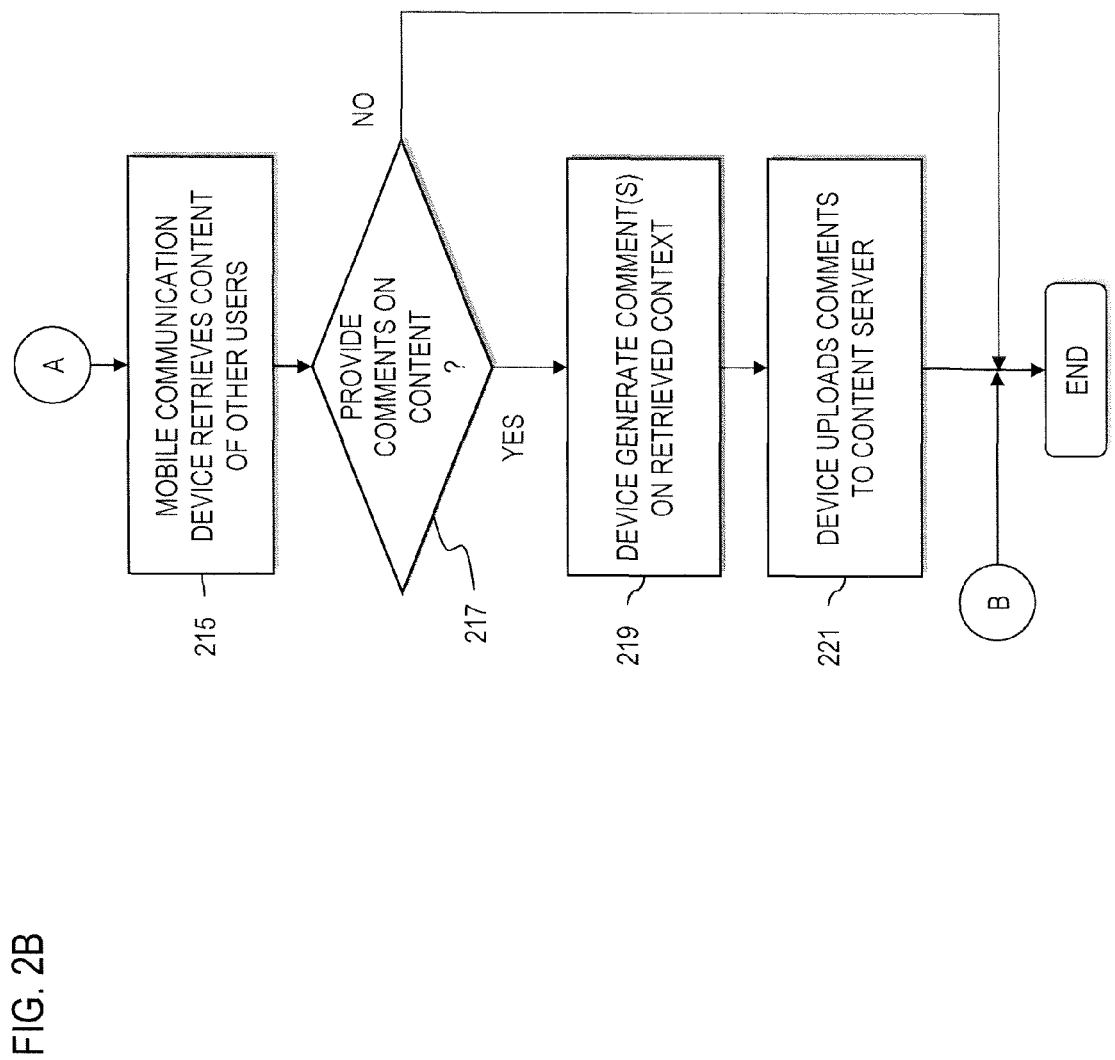

FIG. 2 is a flowchart of a process for sharing content, via mobile communication devices, regarding an event attended by users of the mobile communication devices, according to an exemplary embodiment. In step 201, a mobile communication device (e.g., device 107a) moves within a predefined proximity of an event location. The device 107a receives text notification of the subject event, per step 203. By way of example, the notification can specify information relating to the event as well as instructions on how to share content: (1) event name, (2) short description of how to upload text, pictures and video about the event, (3) short description of how to view others text, pictures and videos contributed by others at the event, and (4) any required adverting disclaimers to satisfy anti-spam/legal requirements.

Additionally, the device 107a receives a prompt (e.g., Yes/No prompt) to permit the user to indicate desired participation in the service (step 205). If the user indicates that participation is desired (as in step 207), the user, via the device 107a, can generate content about the event. For example, in steps 209 and 211, the user can write a text description, take a picture, and/or record a short video of the event for uploading to the content module 103 within the event content sharing platform 101.

In step 213, the user can determine whether to view content from other users. If so, the device 107a can retrieve the content, as in step 215. At this point, the user can elect to provide comments about the retrieved content, in which the comments are accordingly uploaded (steps 217-221).

According to one embodiment, when the event ends, the capability to send messages, pictures and video via the wireless devices 107a-107n terminates. However, users can still review the multi-media messages via a web browser either on the wireless device 107a-107n or PC 129.

Figure 3:
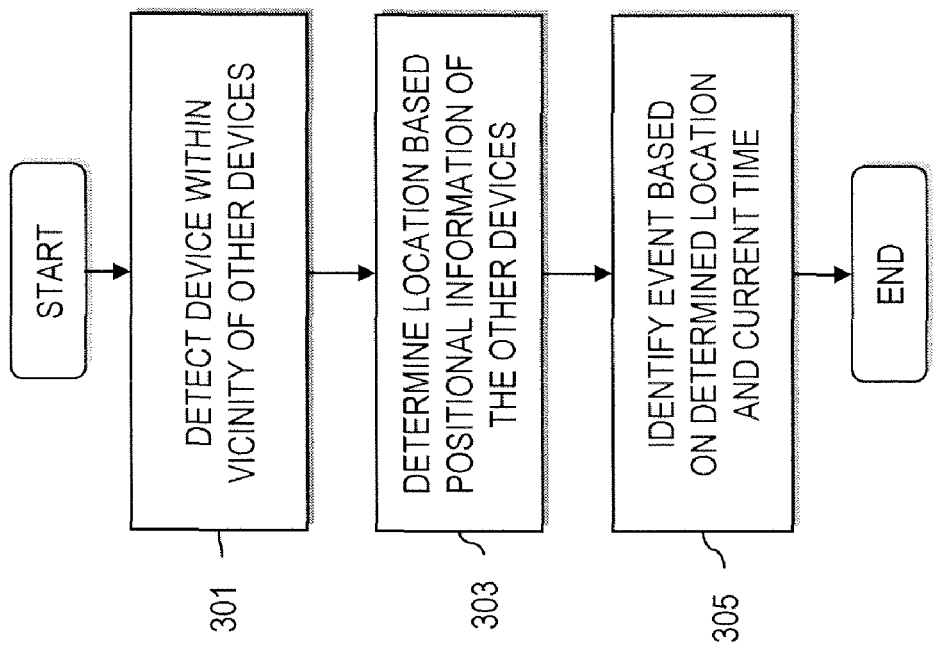
FIG. 3 is a flowchart of a process for identifying an event attended by users of mobile communication devices, according to an exemplary embodiment.

FIG. 3 is a flowchart of a process for identifying an event attended by users of mobile communication devices, according to an exemplary embodiment. First, in step 301, the platform 101 detects that a device 107a is within a vicinity of other devices 107b-107n. Parameters relating to the vicinity and number of devices can be set, so that a minimum number of users are present and the number of proper devices 107a-107n (e.g., GPS-enabled, capable of taking pictures and video, etc.) are present. Location of the event is determined based on the position information of the other devices 107b-107n, as in step 303. The platform 101 looks up the location name based on the GPS coordinates (i.e., a reverse geocode operation). Using this location and the current time, the platform 101 identifies the event, per step 305. Specifically, the event and presence service module 115 accesses the location and event database 117 to determine the subject event. The database 117 can store, for example, event description (e.g., type, name), as well as location and time.

As mentioned, the content that is generated by the mobile communication devices 107a-107n can be shared with users outside of the venue location 109.

Figure 4:
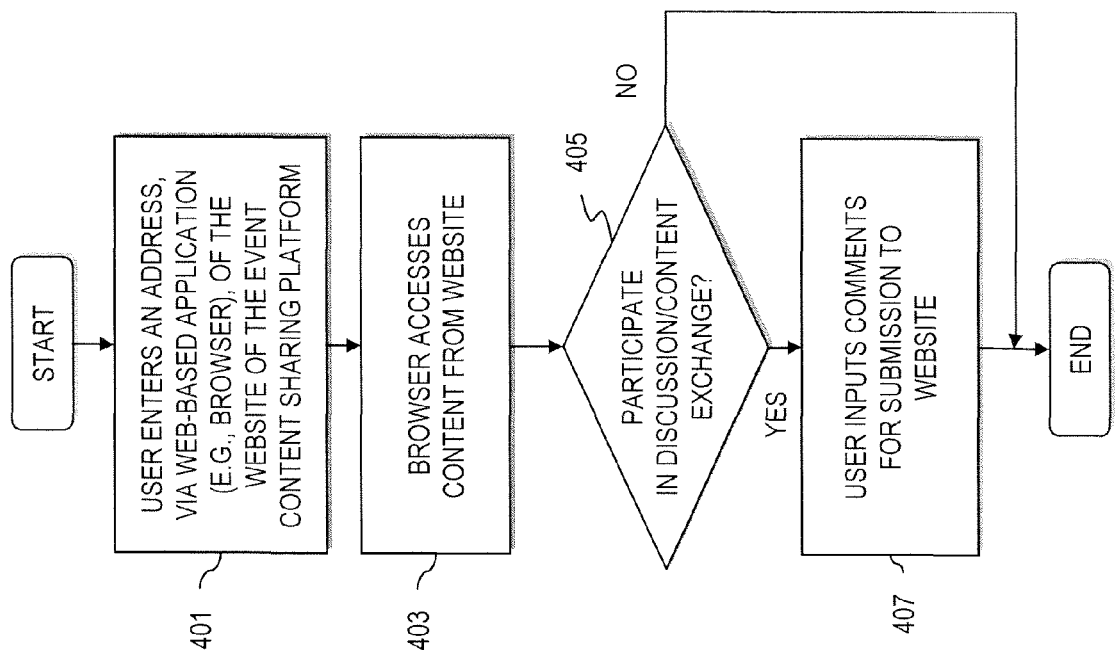
FIG. 4 is a flowchart of a process for accessing content of an event using a web-based application, according to an exemplary embodiment.

FIG. 4 is a flowchart of a process for accessing content of an event using a web-based application, according to an exemplary embodiment. Under this scenario, a user of the computing device 129 can utilize a web-based application (e.g., browser) to enter an address, such as a Uniform Resource Locator (URL), of the website 131, per steps 401 and 403. In step 405, the browser can also present the user with an option to participate in any discussion or comment on the content that is exchanged. If the user opts to participate (as in step 405), the user inputs comments for submission to the website 131 (step 407).

It is contemplated that the user of the computing device 129 can view content from multiple events, concurrently. As such, events can be categorized, e.g., by topic (rock concert, football game, town fair) and by location. When users view the event messages on the device 129, they can receive advertisements targeted to future events in the same general area.

Figure 5:
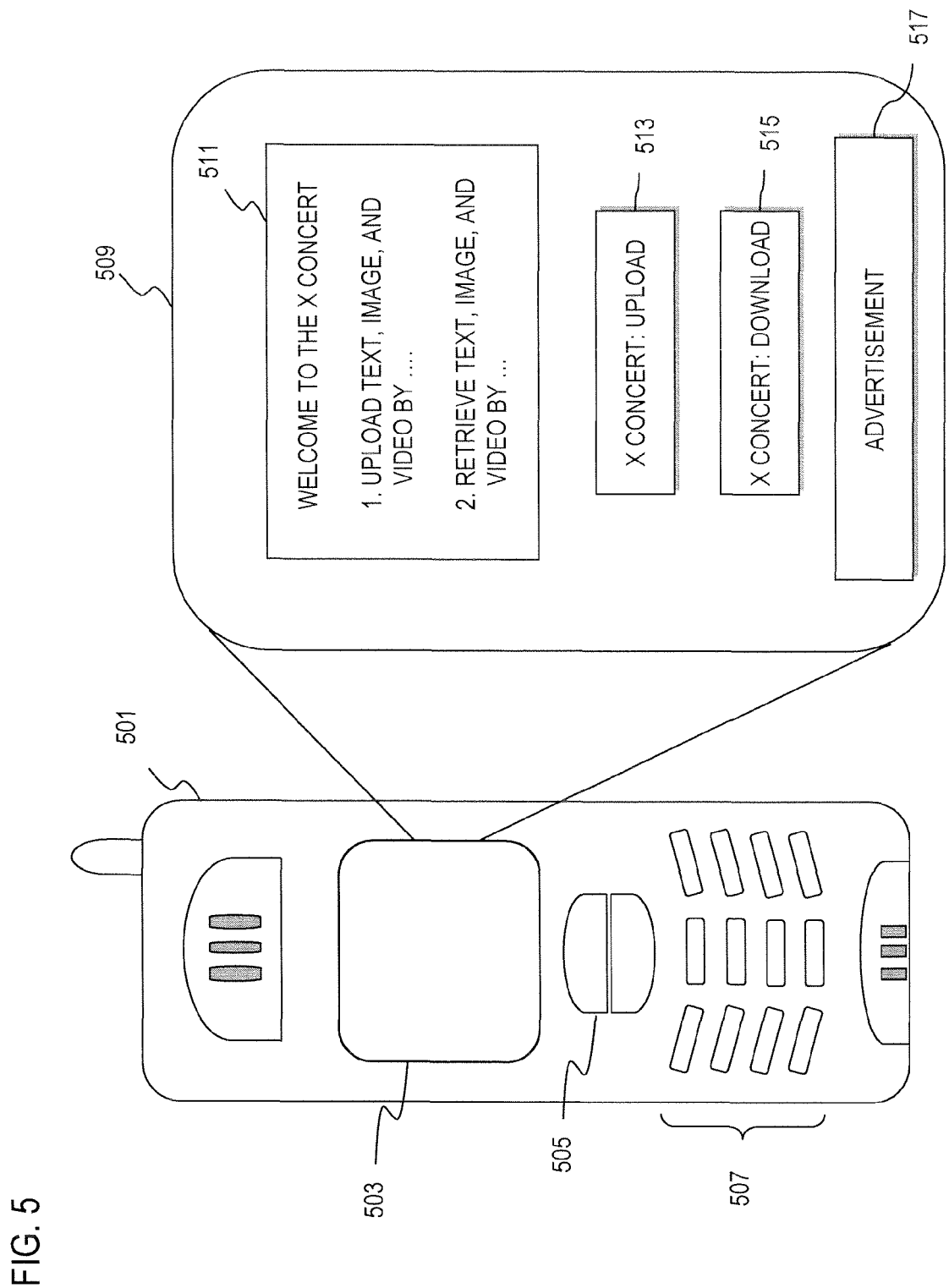
FIG. 5 is a diagram of a mobile communication device utilizing a user interface for participating in an event, according to an exemplary embodiment.

FIG. 5 is a diagram of a mobile communication device utilizing a user interface for participating in an event, according to an exemplary embodiment. Under this scenario, a mobile device 501 includes a display 503 that is configured to present content that is generated for a particular event. In one embodiment, the user of the mobile device 501 can input information, via cursor buttons 505 or key pad 507. Further, these cursor buttons 505 or keys of the key pad 507 can control a camera function or an audio recording function.

Upon entry into the event venue 109, the device 501 presents an event notification menu 509. A text box 511 provides information on the event and instructions regarding content sharing. Additionally, the menu 513 displays an upload button 513 to transmit locally generated content to the platform 101, using text or multimedia messaging (e.g., SMS and MMS). Further, a download button 515 can be selected by the user to retrieve shared content.

Moreover, the device 501 can receive advertisements 517 that are targeted to attendees of the event.

The above described processes relating to providing event content sharing using an integrated set-top may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
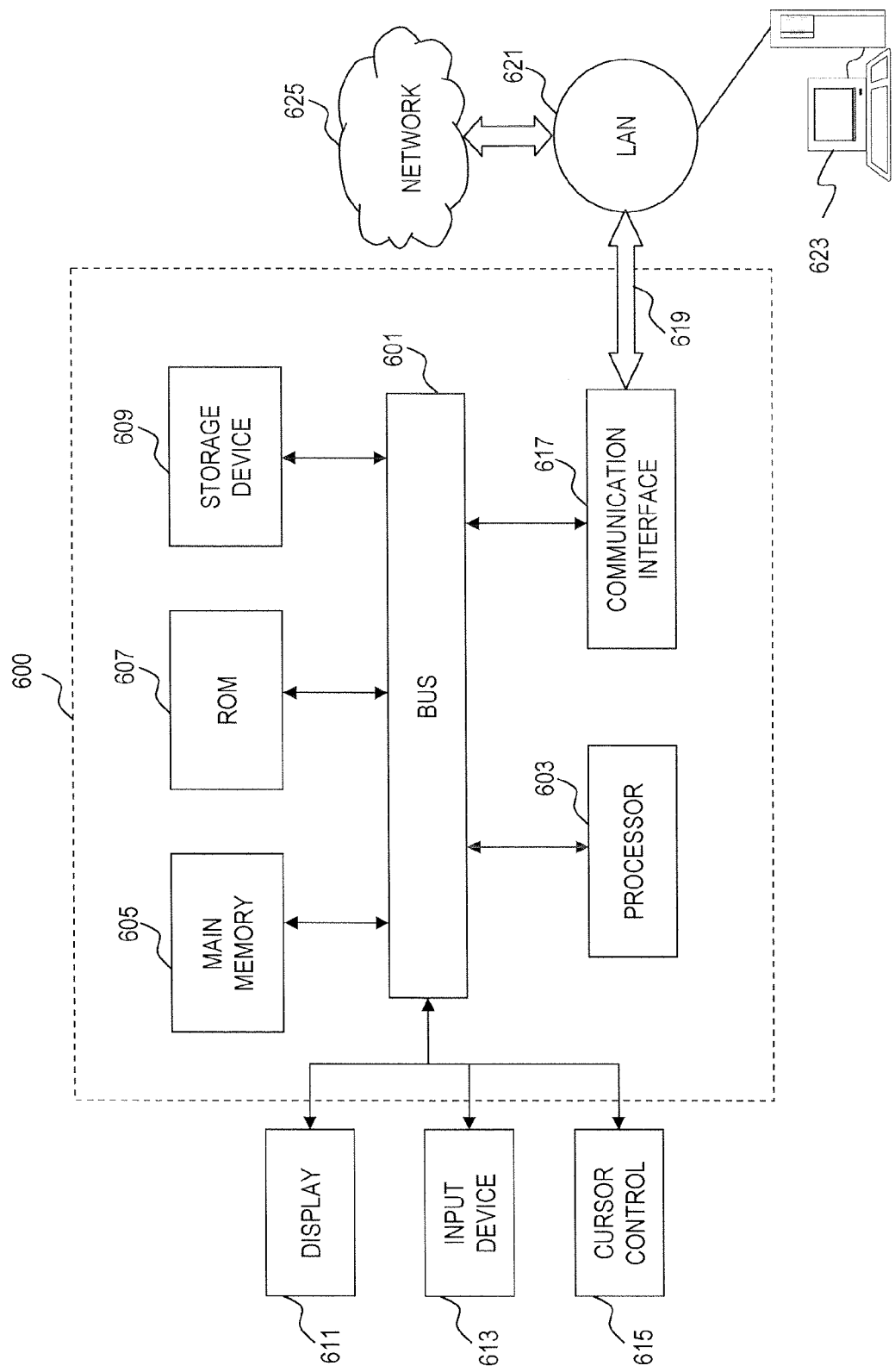
FIG. 6 is a diagram of a computer system that can be used to implement various exemplary embodiments.

FIG. 6 illustrates a computer system 600 upon which an exemplary embodiment can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the exemplary embodiment. Thus, exemplary embodiments are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an exemplary embodiment through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   detecting a plurality of mobile communication devices within a predetermined location;
   identifying an event corresponding to the predetermined location and a current time by accessing a third party event database;
   notifying the mobile communication devices to enable exchange of content about the event; and
   receiving the content from one or more of the mobile communication devices,
   wherein the content is accessible by the mobile communication devices.

2. The method according to claim 1, wherein the content includes text, image, audio, video, or a combination thereof.

3. The method according to claim 1, wherein the content is exchanged via a Short Message Service (SMS) protocol or a Multimedia Messaging Service (MMS) protocol.

4. The method according to claim 1, further comprising:
   receiving positional information from one of the mobile communication devices to determine location of the event.

5. The method according to claim 1, wherein the content is accessible by a computing device that is separate from the mobile communication devices.

6. The method according to claim 5, wherein the computing device is configured to run a web-based application to access the content, the computing device receiving an advertisement message that is targeted based on the event.

7. A system comprising:
   an event and presence service module configured to detect a plurality of mobile communication devices within a predetermined location, and to identify an event corresponding to the predetermined location and a current time by accessing a third party event database, wherein the event and presence service module is further configured to notify the mobile communication devices to enable exchange of content about the event; and
   a content module configured to receive the content from one or more of the mobile communication devices, wherein the content is accessible by the mobile communication devices.

8. The system according to claim 7, wherein the content includes text, image, audio, video, or a combination thereof.

9. The system according to claim 7, wherein the content is exchanged via a Short Message Service (SMS) protocol or a Multimedia Messaging Service (MMS) protocol.

10. The system according to claim 7, wherein the event and presence service module configured to is further configured to receive positional information from one of the mobile communication devices to determine location of the event.

11. The system according to claim 7, wherein the content is accessible by a computing device that is separate from the mobile communication devices.

12. The system according to claim 11, further comprising:
    a website that is configured to provide the content to the computing device, wherein the computing device is configured to run a web-based application to access the content from the website, and receives an advertisement message that is targeted based on the event.

* * * * *